United States Patent [19]
Simon et al.

[11] Patent Number: 4,859,347
[45] Date of Patent: Aug. 22, 1989

[54] CENTRIFUGAL SEPARATOR

[76] Inventors: Wayne E. Simon, P.O. Box 125, 28479 Douglas Park Rd., Evergreen, Colo. 80439; Willy Z. Sadeh, 2020 Brookwood Dr., Fort Collins, Colo. 80525; Edward R. Kerin, 2520 Romeldale Ct., Fort Collins, Colo. 80526; Bernard W. Gamson, 11124 Hunt Club Dr., Potomac, Md. 20854

[21] Appl. No.: 273,407

[22] Filed: Nov. 18, 1988

[51] Int. Cl.[4] ............................................. B01D 17/038
[52] U.S. Cl. ..................... 210/788; 209/144; 209/211; 210/512.1
[58] Field of Search ..................... 210/787, 788, 512.1; 209/144, 211

[56] References Cited

U.S. PATENT DOCUMENTS

| | | |
|---|---|---|
| 3,734,288 | 5/1973 | Skardal . |
| 4,378,289 | 3/1983 | Hunter . |
| 4,388,045 | 6/1983 | Simon . |
| 4,394,138 | 7/1983 | Schilling . |
| 4,414,112 | 11/1983 | Simpson et al. . |
| 4,464,264 | 8/1984 | Carroll . |
| 4,578,199 | 3/1986 | Peel et al. . |
| 4,587,859 | 7/1986 | Beck . |

*Primary Examiner*—Frank Sever
*Attorney, Agent, or Firm*—Tarolli, Sundheim & Covell

[57] ABSTRACT

An apparatus and method for centrifugally separating the component species of a mixture, at least one of which species is a fluid, when the mixture includes at least one or more species of specific weight different from that of the fluid. The mixture is fed tangentially into the inlet end of a converging nozzle, at high speed, to establish an axial helical flow path of the mixture. As the mixture moves along the converging nozzle, generally the lighter species collect in the center and the heavier ones collect at the outside wall. A throat of constant diameter or slightly converging angle may follow the nozzle. As the mixture moves through the throat, the radial separation is maintained similarly as in the nozzle. A diverging diffuser is located downstream of the throat and a throttle valve element is located at least partially within the diverging diffuser. The throttle valve element controls the size of the diffuser gap between the throttle valve element and the diffuser. This controls outlet area and thus flow of the mixture. The lighter species are generally extracted through one or more axially-centered openings in the throttle valve element, while heavier species exit through the diffuser gap. Heavy species can also be collected through one or more openings in the throat wall.

33 Claims, 2 Drawing Sheets

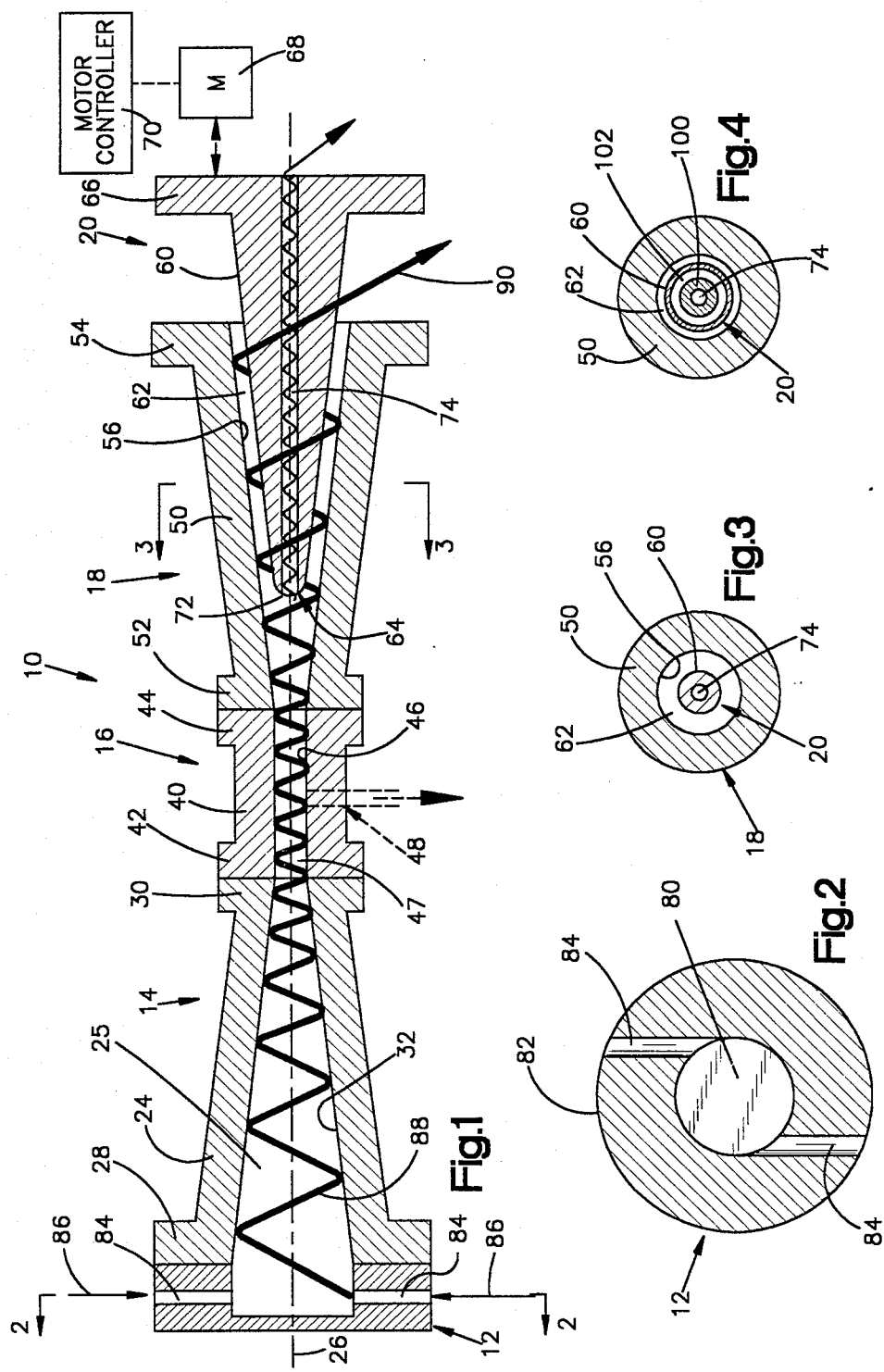

CENTRIFUGAL SEPARATOR

TECHNICAL FIELD

The present invention relates to separation of the differing weight and/or size component species of a mixture. The present invention more specifically relates to passive centrifuges which induce radial separation of the differing weight and/or size component species of a mixture.

BACKGROUND OF THE INVENTION

Efficient separation of a mixture into its components is of importance in many industries—for example, in the petroleum, pharmaceutical and chemical industries. Active centrifuges are commonly used to separate species of different molecular weights and densities. In an active centrifuge, centrifugal force is mechanically produced by the rotation of a bowl or some other mechanical device. Passive centrifuges are also known. A cyclone separator is one type of passive centrifuge which is utilized for separation of small solid particles from gases. In a cyclone separator, the mixture is accelerated axially inside a converging cone whereby heavier species such as the solid particles migrate radially outwardly to be extracted at the conical tip, while the lighter species such as the gases collect in the center and are drawn out through an axially-located extraction tube at the inlet end of the device.

The flow in a cyclone separator consists of a double vortex: a larger downward vortex that carries the solid particles near the wall, and a smaller inner upward vortex that carries the gas. This dual vortex flow is quite inefficient and smaller particles are commonly carried out of the device with the gas. Also, a cyclone separator must be vertically oriented to allow gravitational exit of solid particles through its conical bottom. Other separators are known which are uni-directional in operation, i.e., which extract both the lighter species and the heavier species at the end opposite the inlet.

SUMMARY OF THE INVENTION

The present invention is an apparatus and method for separating the component species of a mixture, at least one of which species is a fluid, when the mixture includes at least one or more species of specific weight different from the fluid. The mixture is fed into the inlet end of a converging nozzle at high speed to establish an axial helical flow path of the mixture. As the mixture moves along the converging nozzle, generally the lighter species collect in the center and the heavier species collect at the outside wall. The nozzle may be followed by a throat section of constant diameter or slightly tapered, either converging or diverging, and then a diverging diffuser, or may be followed directly by the diverging diffuser. A throttle valve element is located at least partially within the diverging diffuser. The throttle valve element controls the size of the diffuser gap between the throttle valve element and the diffuser. This controls outlet area, and thus back pressure and flow of the mixture. Radially inwardly disposed species are extracted through one or more openings in the throttle valve element, while radially outwardly disposed species exit through the diffuser gap and/or openings in the throat wall. The separator has no moving parts, needs no external power source, and is operable in any orientation.

BRIEF DESCRIPTION OF THE DRAWINGS

Further features of the present invention will become apparent to those skilled in the art to which the present invention relates from reading the following specification with reference to the accompanying drawings, in which:

FIG. 1 is a longitudinal sectional view, partially schematic, through a separator in accordance with the present invention;

FIG. 2 is a transverse sectional view through the feeding plate of the separator of FIG. 1, taken along the lines 2—2 of FIG. 1;

FIG. 3 is a transverse sectional view taken along the lines 3—3 of FIG. 1;

FIG. 4 is a transverse sectional view similar to FIG. 3 showing another embodiment of the throttle valve element;

DESCRIPTION OF A SPECIFIC PREFERRED EMBODIMENT OF THE INVENTION

Figure 5:
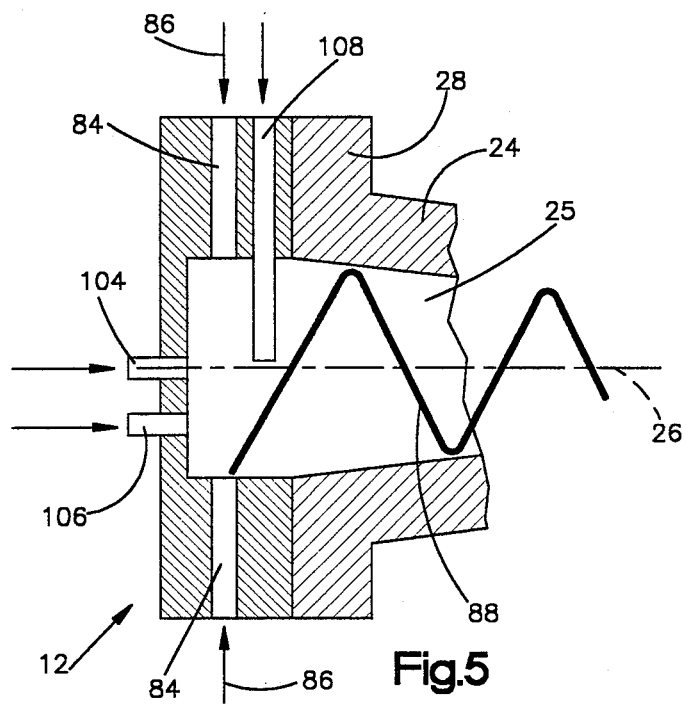
FIG. 5 shows an alternative embodiment of the inlet end of the separator of FIG. 1.

FIG. 1 shows schematically the overall configuration of a separator 10 in accordance with the present invention. The separator 10 includes generally a feeding plate 12, a converging nozzle 14, a diverging diffuser 18, and a throttle valve element 20. In the preferred embodiment shown in the drawings, the separator 10 also includes a throat section 16 intermediate the converging nozzle 14 and the diverging diffuser 18, although this is optional as will be further discussed hereinafter.

The converging nozzle 14 is a generally conically-shaped element having a wall 24 which extends at an angle to a longitudinal axis 26 of the separator 10. The wall 24 defines a converging vortex chamber 25 inside the nozzle 14. The converging nozzle 14 has a leading end portion 28 for mounting the feeding plate 12, and a trailing end portion 30 for mounting the throat 16. The interior surface 32 of the wall 24 of the converging nozzle lies at a baseline angle to the longitudinal axis 26 which is in the range of 1° to 15°, and preferably about 3° to about 6°.

The throat 16 is secured to the downstream end of the converging nozzle 14 and includes a central portion 40, a leading end portion 42, and a trailing end portion 44. The leading end portion 42 of the throat 16 is attached to the trailing end portion 30 of the converging nozzle 14 in a fluid-tight relation. The trailing end portion 44 of the throat 16 is attached to the diverging diffuser 18 in a fluid-tight relation.

The interior wall 46 of the throat 16, which defines a throat chamber 47, is preferably cylindrical, and of the same diameter as the trailing end of the interior wall 32 of the converging nozzle 14. The interior wall 46 of the throat 16 may, however, have a slightly tapered configuration, preferably converging but possibly diverging; that is, it may be the same diameter at its upstream end as the outlet from the converging nozzle 14, but slightly narrower or larger in diameter at the trailing end portion 44 which it exits into the diffuser 18. This optional tapered configuration may assist in maintaining vortical separation within the throat 16.

The diverging diffuser 18 has a generally conical configuration similar to the converging nozzle 14 and is wider at its downstream end. The diffuser 18 includes a wall 50 extending between a leading end portion 52 and a trailing end portion 54. The leading end portion 52 of the diffuser 18 is secured to the trailing end portion 44 of the throat 16 in a fluid-tight relationship. The interior diameter of the diffuser 18, at its inlet end, is the same as that of the outlet from the throat 16. An interior wall surface 56 of the diffuser 18 extends at preferably the same baseline angle to the axis 26, as does the interior wall 32 of the converging nozzle 14. In the preferred embodiment, the diffuser geometry is the mirror image of the nozzle; however, the diffuser may have a baseline angle either greater than or less than that of the nozzle.

A throttle valve element 20 is disposed at least partially within the diffuser 18. The throttle valve element 20 has an exterior surface 60 extending at the same angle to the axis 26 as the interior surface 56 of the diffuser 18. The surfaces 56 and 60 define between them an annular conically extending diffuser gap 62. The throttle valve element 20 has a tip 64 and a trailing end portion 66. An opening 72 in the tip 64 is in fluid communication with a passage 74 through the throttle valve element 20.

The throttle valve element 20 is movable axially by a motor 68 which is controlled by a motor controller 70. The motor 68 is preferably a stepper motor having a fine range of adjustment by the motor controller 70. The motor 68 varies the axial location of the throttle valve element 20 relative to the diffuser 18. This controls, therefore, the size of the diffuser gap 62.

The feeding plate 12 (FIG. 2) has a circular central recess 80. A pair of inlet ports 84 open approximately tangentially into the recess 80 of the feeding plate 12. A different number of inlet ports can be used if desired. When a fluid mixture is fed in the direction of arrows 86 (FIG. 1) through inlet ports 84 into feeding plate 12, it circulates about the inner circumference of the recess 80 in the feeding plate 12. The mixture then begins to circulate about the interior surface 32 of converging nozzle 14. At the same time, the mixture also travels longitudinally along the converging nozzle 14 toward the throat 16. Accordingly, the fluid assumes a helical path of travel as indicated schematically at 88 in FIG. 1. This helical path of travel is maintained within the throat 16 and the diffuser 18.

There is thus formed a strong three dimensional forced vortex inside the vortex chamber 25. This forced vortex generally causes heavier species within a mixture to migrate toward the wall 32 and lighter species to collect toward the axis 26 of the vortex chamber 25. There is thus obtained a radial separation of the component species within the mixture, by weight, density, or particle size. Because the nozzle 14 has a converging shape, the mixture tends to accelerate as it travels downstream through the vortex chamber 25. This increases the radial force acting on the mixture, thus increasing the separation of the component species within the mixture.

By the time a mixture reaches the throat 16, there is generally a well defined separation between the lighter species along the axis 26 and the heavier species at the outside of the throat 16. The lighter species along the core are easily extracted through the opening 72 in the tip of the throttle valve element 20, and pass outwardly through the passage 74. The heavier species will continue flowing outwardly through the diffuser gap 62 and can be extracted and collected elsewhere, as indicated schematically by the arrow 90. Some of the heavier species, along the outside wall, can also be extracted through one or more openings 48 in the throat 16. The piping, collection apparatus, etc., necessary for all collection is well within the ordinary skill of the art and will not be further described herein.

The separator 10 must be dimensioned to provide sufficient residence time for the fluid mixture within the converging nozzle 14, to allow the vortical flow to fully develop. The vortex is, of course, also affected by variables such as the size of the inlet ports 84, the flow volume, pressure and rate through the inlet ports 84, and flowrate through the separator.

The positioning of the throttle valve element 20 controls back pressure in the separator 10 and thus affects flowrate. Back pressure in the separator 10 is inversely proportional to the outlet area. Axial positioning of the throttle valve element 20 controls the size of the diffuser gap 62 and, thus, the flow outlet area for the primary (or carrier) fluid. As the throttle valve element 20 is positioned more closely into the diffuser 18, the gap 62 between the throttle valve element and the diffuser 18, as measured in a direction normal to surface 60, becomes smaller, thus decreasing the outlet area and increasing back pressure in the separator 10. Conversely, as the throttle valve element 20 is positioned farther out from the diffuser 18, the gap 62 between the throttle valve element and the diffuser 18 becomes larger, thus increasing the outlet area and decreasing back pressure in the separator 10. Thus, adjustment of the throttle valve fixes the diffuser gap and establishes the needed back pressure to control the flowrate and sustain the flow through the separator.

As shown in the drawings, the throttle valve element 20 does not extend into the throat 16. In this regard, it is understood that the drawings are schematic in nature and the tip 64 of the throttle valve element 20 would generally be located near to the throat 16. This is a matter of design choice depending on operation, however, as noted above; the tip 64 of the throttle valve element 20 may also extend into the throat 16 if desired. In this regard, it should also be noted that the throat 16 may be of varying length. The throat 16 provides a stable section for the vortex so as to provide for removal of some of the heavier species through one or more openings 48 in the wall of the throat 16. The throat 16 may, however, be omitted entirely if desired, with the converging nozzle 14 opening directly into the diffuser 18. In such a case, the throttle valve element 20 may extend directly into the converging nozzle 14.

In an alternative embodiment as shown schematically in FIG. 4, more than one spaced openings are provided in the throttle valve element 20, in order to extract different weight species and/or different particle sizes at different radial locations. FIG. 4 shows the centrally disposed passage 74 (which is also shown in FIG. 1) for removal of the lightest weight fractions along the axis of the separator. Also shown in FIG. 4 is an annulus 102 defined by an additional concentric wall 100 disposed radially between the passage 74 and the exterior of the throttle valve element 20. The annulus 102 is in fluid communication with a second opening (not shown) in the tip 64 of the throttle valve element 20; and is connected by means of appropriate passages (not shown) within the throttle valve element 20 to the collection point for the species extracted therethrough. In principle, a number of different species or fractions of different weights or particle sizes can be extracted from the separator 10 through the throttle valve element 20, by providing openings in the throttle valve element 20 at appropriate radial locations to collect the various separated fractions from a mixture flowing past.

FIG. 5 shows a further alternative embodiment in which various components of a mixture may be fed into the converging nozzle 14 at locations other than through the inlet ports 84. FIG. 5 indicates schematically how one or more components of a mixture may also be fed into the vortex chamber 25 through an inlet port 104 located axially along the feeding plate 12; and/or through one or more inlet ports 106 located radially outwards from the axis of feeding plate 12; and/or through one or more inlet ports 108 extending through the circumferential wall of the feeding plate 12 (or of the converging nozzle 14), somewhat downstream of the inlet ports 86 and extending radially inwardly approximately to the axis 26 of the separator 10.

It should be noted that the use, in this specification and the appended claims, of the terms "fluid", "fluid mixture", "mixture", or "species" is intended to encompass all flowable materials which may feasibly be separated in an apparatus such as a separator 10. This would include, for example, various combinations of liquid and liquid, liquid and gas, gas and gas, liquid and solid, etc. More specifically, mixtures capable of separation in the separator 10 would always include at least one fluid which is a liquid or a gas or the uniform phase (above the critical temperature and/or pressure), and at least one or more species of specific weight different from that of the fluid. Accordingly, it should be understood that reference herein to the presence of a "mixture" or "fluid", at any given point within or downstream of the converging nozzle 14, may, if not otherwise indicated, mean a mixture or one or more of its component species.

Also, the use herein of the terms "lighter species" or "heavier species" is intended generally to indicate materials which will tend to accumulate radially inwardly or radially outwardly respectively in the separator 10. For liquids and gases, density and specific weight are the same at constant temperature and pressure; thus, it is possible to say that the denser material, or the material of higher specific weight, will be cast to the outside while the less dense or lower specific weight material will collect closer to the axis.

For solids, however, this is not necessarily so. If a particle is pure solid matter, the density and the specific weight of the particle are the same. However, if the particle is not purely composed of solid material alone, but also includes, for example, some captured air, then the density and the specific weight will differ. With sufficient residence time in the vortex, any particle with a higher specific weight and of the same particle size will migrate radially outwards a greater distance than a similarly sized particle of a lower specific weight. By controlling residence time, particles of a smaller size and of higher specific weight can remain radially inwardly while particles of a larger size but of lower specific weight can be cast outwardly. Thus, it would be possible to extract such fine size solid particles through the opening 72 in the tip 64 of the throttle valve element 20.

Figure 6:
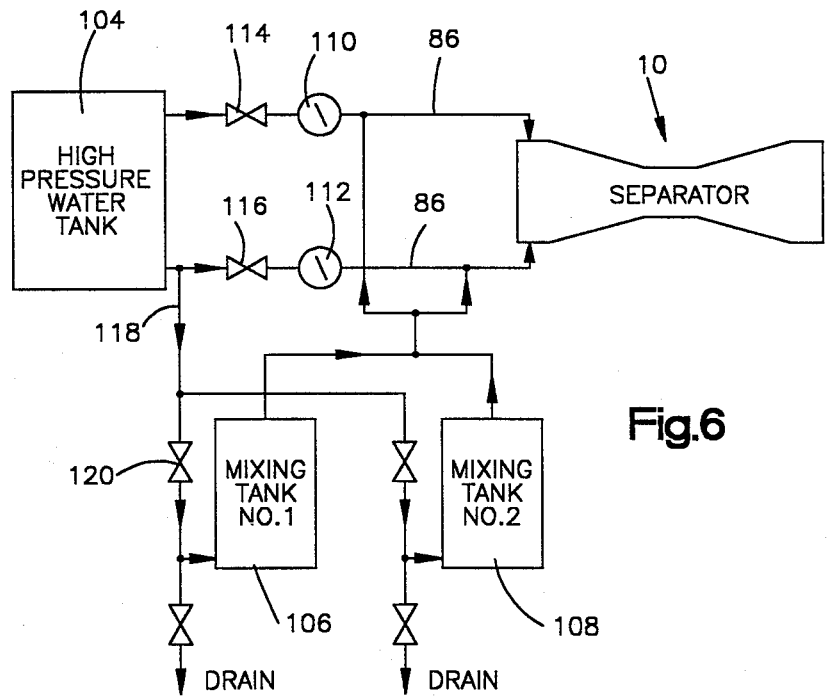
FIG. 6 is a schematic diagram of a test separation system incorporating the present invention.

FIG. 6 is a schematic diagram of a system which has been used to test a separator constructed in accordance with the present invention. The system includes a high-pressure water reservoir 104; a pair of mixing tanks 106 and 108; a pair of flowmeters 110 and 112; and associated valves and piping. By means of this system, mixtures of up to three different species are produced and separated. The major species of the mixture as used in the tests described herein is water, also sometimes termed the primary liquid or carrier fluid. The other species, which are either liquid or solid particles, are the secondary species.

The primary liquid supplied by the high pressure reservoir 104 operates the system shown in FIG. 6. Water flows through the primary supply lines 86 into the separator 10. The valves 114 and 116 control the flowrate of the primary liquid and the flowmeters 110 and 112 monitor the flowrate.

The secondary species are supplied from the mixing tanks 106 and 108. Some primary liquid is diverted through line 118 to each mixing tank 106 and 108 and forces the secondary species out of each tank. The flowrate of the diverted liquid is regulated by the valves 120 and 122, and thus controls the flowrate of the secondary species. The discharge from the mixing tanks is mixed with the primary liquid, before entering the separator 10, in the primary lines 86.

To test the system, various mixtures of water, cork particles, steel particles, and/or oil were injected into the separator 10 by the feeding system. Either one or both mixing tanks 106 and 108 were filled with a single or two secondary species. In the case of solid particles, the discharge from each tank was a mixture of cork and/or steel particles with water. The oil was discharged by a single tank and was mixed with water in the primary supply lines 86.

Design and dimensioning of the particular separator apparatus used in these tests was conducted assuming steady isentropic flow of air, given inlet and throat velocity, throat radius and baseline angle. These choices were made in order to obtain an apparatus design consistent with the condition for constant mass flowrate. Design parameters were obtained using the axial velocity since it controls the mass flowrate. The experimental objectives called for a high relative mass flowrate (or high axial velocity in the throat) while still maintaining a reasonable bench size apparatus. These requirements were satisfied by choosing a throat of 1.0 in (2.54 cm) diameter and 5.0 in (12.7 cm) length with a high subsonic axial Mach number of 0.8 in the throat.

Adequate residence time in the nozzle was needed to allow the vortical flow to fully develop, requiring the nozzle to be of sufficient length. For a given throat area, the nozzle length is inversely proportional to the axial Mach number at its entrance. Smaller inlet Mach numbers are needed for longer residence times. An inlet axial Mach number of 0.05 was selected to obtain a nozzle length of the desired size.

A baseline angle $\alpha = 6°$ was employed to forestall any boundary-layer separation. The ratio of the nozzle radius at any axial position $R(x)$ to the throat radius $R_t$ is given, according to geometric consideration, by the relationship $$\frac{R(x)}{R_t} = 1 + \frac{(L_v - x)\tan\alpha}{R_t}, \quad (2.1)$$

where x designates the axial distance measured from the nozzle inlet and $L_v$ is the length of the nozzle. Solution of Eq. (2.1) for $L_v$ using conditions at the nozzle inlet, i.e., $x=0$ and $R(x)=R_i$ the inlet radius, leads to $$L_v = R_t(R_i/R_t - 1)/\tan\alpha \quad (2.2)$$

The nozzle length $L_v$ depends only on the inlet radius $R_i$ with given throat radius $R_t$ and baseline angle $\alpha$.

The inlet radius can be determined utilizing the mass flowrate continuity condition which is given by $$m = A(x)\left(2P_0\rho_0 \frac{k}{k-1}\right)^{\frac{1}{2}} \left(\frac{P(x)}{P_0}\right)^{\frac{1}{k}} \left[1 - \left(\frac{P(x)}{P_0}\right)^{\frac{k-1}{k}}\right]^{\frac{1}{2}} \quad (2.3)$$

where $A(x)$ and $P(x)$ denote the cross-sectional area and pressure at any axial position x, $P_o$ and $\rho_o$ designate the stagnation pressure and density, and k is the ratio of specific heats at constant pressure and constant volume. Next, the pressure ratio $P(x)/P_o$ is expressed in terms of the axial Mach number $M(x)$ and k by $$\frac{P(x)}{P_0} = \left(1 + \frac{k-1}{2} M^2(x)\right)^{-\frac{k}{k-1}}. \quad (2.4)$$

Substitution of (2.4) into (2.3) results in the following expression for the mass flowrate:

$$m = A(x)\left(2P_0\rho_0 \frac{k}{k-1}\right)^{\frac{1}{2}} \left(1 + \frac{k-1}{2} M^2(x)\right)^{-\frac{1}{k-1}} \left[1 - \left(1 + \frac{k-1}{2} M^2(x)\right)^{-1}\right]^{\frac{1}{2}}. \quad (2.5)$$

Two local relationships for the mass flowrate are obtained by writing Eq. (2.5) in terms of the conditions at the inlet to the nozzle $(M(x)) = M_i$, $A(x) = A_i$ and in the throat $(M(x) = M_t, A(x) = A_t)$. Manipulation of these two relationships leads to the following expression for the ratio of the inlet to throat areas:

$$\frac{A_i}{A_t} = \left[\frac{1 + \frac{k-1}{2} M_t^2}{1 + \frac{k-1}{2} M_i^2}\right]^{-\frac{1}{k-1}} \left[\frac{1 - \left(1 + \frac{k-1}{2} M_t^2\right)^{-1}}{1 - \left(1 + \frac{k-1}{2} M_i^2\right)^{-1}}\right]^{\frac{1}{2}} \quad (2.6)$$

For given values of the inlet axial Mach number $M_i = 0.05$, axial throat Mach number $M_t = 0.8$ and $k = 1.4$ (air), the ratio of the inlet to the throat area $A_i/A_t = 11.32$. Thus, the corresponding ratio of the inlet radius to the throat radius is 3.36, and the inlet radius $R_i = 1.68$ in (4.27 cm) as the throat radius is 0.5 in (1.27 cm). Next, according to Eq. (2.2) and for the selected baseline angle of 60° the nozzle length $L_v = 11.2$ in (28.45 cm).

The separator used in the tests was manufactured from acrylic to allow the visualization of the flow and separation characteristics. In view of the relatively high internal pressure, a wall thickness of 1.0 in (2.54 cm) was used. This thickness permits a maximum working pressure of about 700 psi (4.83 MPa) provided that the entire apparatus is made of a single piece without any joints, flanging and glueing of parts, and holes for pressure taps and probe insertion. When the apparatus is constructed of sections bolted together and equipped with measurement taps, the maximum estimated working pressure is 200 to 250 psi.

EXAMPLE 1

As an initial test, water was injected into the separator without any secondary species, to produce differential distillation. The water, like most ordinary water, contained a certain amount of dissolved air, and operation of the separator produced a distinct air core around the vortex axis. The pressure in the vortex is, of course, lowest near the axis and largest at the wall. This prevailing radial pressure gradient caused the dissolved air to diffuse toward and concentrate in a core around the axis. Thus, the core consisted of air which was contained in the incoming water. The core had a cylindrical shape with a constant average diameter throughout the vortex chamber and most of the throat. The core broke up as it neared the tip of the throttle valve element which acts as a stagnation point. Breakup of the core can be avoided by applying suction at the tip of the throttle valve element, which would remove the stagnation condition and permit the collection of the air in the core.

In the chemical and pharmaceutical industries, differential distillation of a liquid, i.e., the removal of vapor to produce a pure liquid, is used to produce a highly concentrated residual liquid. This can be accomplished by means of a gas evaporative centrifuge. Thus, the present invention can be used for differential distillation, which can be fully achieved by the extraction of the gas core through the throttle valve element.

EXAMPLE 2

Currently, liquid-solid separation is used for removal and recovery of sedimentation particles dispersed in liquids and the removal of excess liquids from solids (drying). These processes are most often accomplished by means of centrifugal settling machines or centrifugal filters.

Liquid-light solid separation was produced by injecting a mixture of water and cork particles into the separator. The prevailing radial pressure gradient forced the cork particles and dissolved air to the center of the vortex. A cork cloud extending up to about one quarter of the length of the vortex chamber was observed. This cloud resulted from the migration of the cork particles from the wall toward the core. The air in the water, being lighter than the cork, formed an inner core around the axis with the cork particles concentrated in a layer around the air core. Total separation was achieved by the time the mixture reached the throat.

EXAMPLE 3

To test separation of liquid and heavy solids, a mixture of steel particles and water was injected into the separator. The heavier steel particles accumulated near the wall while the dissolved air in the water concentrated in a core around the vortex axis. The air core was of approximately the same diameter and exhibited the same breakup in the throat, as in the case of the differential distillation described above. The steel particles concentrated near the wall immediately upon entering the vortex chamber, thus achieving complete separation of the mixture near the inlet to the vortex chamber. The reason for this rapid separation is, of course, the tangential injection of the mixture.

EXAMPLE 4

Separation of liquid, light solids, and heavy solids was achieved using a mixture of water with cork and steel particles. The heavier steel particles immediately concentrated near the wall, this separation occurring in the inlet region of the vortex chamber. The lighter cork particles migrated toward the vortex axis and accumulated around the air core. Complete water-cork separation was accomplished in the last third of the vortex chamber and was maintained throughout the throat. Accordingly, it can be seen that liquid-light solid-heavy solid separation can be accomplished with the extraction of the light solid particles through the tip of the throttle valve element and collection of the heavy solid particles at the wall in the throat area.

EXAMPLE 5

Separation of a liquid and a heavy liquid was demonstrated using a mixture of water and perchloroethylene ($C_2Cl_4$), the perchloroethylene being the heavier liquid. The demonstration clearly revealed the entrainment and concentration of the heavier perchloroethylene near the wall throughout the vortex chamber and throat. Generally, the pathline of the perchloroethylene exhibited a pattern similar to that of the steel particles, with the presence of the air core around the vortex axis also being observed. This indicates that the present invention can be used for liquid-heavy liquid separation, with collection of the heavier species accomplished by removal through an opening in the throat wall, and the lighter (primary or carrier fluid) water, exiting through the diffuser gap.

EXAMPLE 6

A mixture of water and motor oil was injected to test for separation of liquid and light liquid. Immediately upon injection of the mixture, diffusion of the oil from the water toward the vortex core occurred. Total separation was achieved, with the oil concentrating around the air core and a distinct interface between the oil core and the surrounding water being present. Collection of the continuous oil layer through an extraction hole in the tip of the throttle valve element is clearly feasible, with adjustment in the size and location of the extraction opening, combined with axial positioning of the throttle valve element, allowing for optimization of the separation.

More specifically, in the water-oil separation test, a throttle valve element having a 0.20 inch diameter opening in its tip, was used to extract the oil core into a graduated collection tank. Axial positioning of the throttle valve element was adjusted at a resolution of 1/4000th of an inch, using a stepper motor and motor controller. It was found that pressure within the oil core in the throat could be regulated above or below atmospheric pressure, at a given flowrate, by appropriate positioning of the throttle valve element. When the throttle valve element was positioned to provide a small diffuser gap, therefore placing the pressure at above atmospheric, the oil could be extracted at atmospheric pressure. On the other hand, when the oil pressure in the throat was below atmospheric pressure, i.e., resulting from a large diffuser gap, a vacuum was induced to suck the oil core out of the throat through the throttle valve element. The test indicated a separation effectiveness factor of 96%, at both atmospheric pressure and reduced atmospheric pressure. Separators used in series would increase the overall separation effectiveness factor to about 99%.

EXAMPLE 7

Separation of liquid, light liquid, and heavy solid was demonstrated employing a mixture of water, motor oil, and steel particles. Immediate concentration of the steel particles near the wall of the vortex chamber occurred, similarly to the water steel separation. Migration of the oil from the wall toward the vortex core also occurred, as in the water-oil separation test. Complete separation of the three species was accomplished within the first one-third of the length of the vortex chamber, and was maintained throughout the remaining length of the vortex chamber and in the throat. Accordingly, it is evident that complete separation can be achieved by collection of heavier species near the wall in the throat, and extraction of the lighter species through the tip of the throttle valve element, with the heavier liquid being extracted through the diffuser gap.

EXAMPLE 8

Results of the liquid-liquid separation suggest that separation of gases is also feasible. In any gas mixture, the constituent with the largest molecular weight will concentrate near the wall, while the lightest species will collect about the vortex axis. In order to separate gases, one needs high tangential velocities, and, hence, high g-forces. In turn, achievement of a high tangential velocity is contingent upon supplying gases at large stagnation pressures. One major application of gas-gas separation would be the removal of diluent gases from natural gas at the wellhead. The availability of large supply stagnation pressures at the wellhead would permit operation of the separator without additional energy input. A test of gas/gas separation was undertaken using a mixture consisting of 57% helium, with a molecular weight of 4, and 43% carbon dioxide, with a molecular weight of 44. An increase in carbon dioxide concentration to 75%, and a drop in helium concentration to 25%, was measured at the wall of the throat. These results clearly illustrate that a separator in accordance with the present invention can be utilized for gas/gas and gas/solid separation.

Control of the g-force in the separator can be accomplished by varying the inlet tangential velocity through the feeding plate. An increase in this tangential velocity necessarily leads to a larger g-force. The inlet tangential velocity may be increased by (1) increasing the flowrate of the mixture while keeping the cross-sectional area of the inlet ports constant; or, (2) decreasing the cross-sectional area of the inlet ports at a given flowrate. The residence time of the mixture decreases with increasing flowrate. Thus, an effective method for increasing the g-force, and thus separation ability without reducing residence time, is to decrease the diameter of the inlet ports.

The effectiveness of separation depends upon the balance of the centrifugal force and the residence time. An indication of the local separation effectiveness can be expressed by the product of the local centrifugal force (per unit mass) and residence time. Separation effectiveness factor is proportional to the flowrate as the axial velocity, angular velocity and tangential velocity at the wall in the throat increase, while the local residence time scale decreases with increasing flowrate.

From the foregoing description of a preferred embodiment of the invention, those skilled in the art will perceive improvements, changes and modifications in the invention. Such improvements, changes and modifications within the skill of the art are intended to be covered by the appended claims.

What is claimed is:

1. An apparatus for separating component species of a mixture at least one of which species is a fluid, the mixture including at least one or more species of specific weight different from the fluid, said apparatus comprising:
   vortex forming means;
   feeding means for feeding the mixture into said vortex forming means to establish a vortex therein to induce radial separation of the species;
   diffuser means communicating with the downstream end of said vortex forming means;
   throttle means for controlling flow of the mixture, said throttle means including a throttle valve element which is disposed at least partially within said diffuser means and which cooperates with said diffuser means to control flow of the mixture including means for providing at least a first outlet and a second annular outlet of variable cross-sectional area; and
   means for extracting at least one of said species through said throttle valve element.

2. An apparatus as defined in claim 1 comprising means for moving said throttle valve element axially relative to said diffuser means.

3. An apparatus as defined in claim 1 wherein said diffuser means and said throttle valve element are shaped complementary to each other, said throttle valve element is disposed coaxially with said diffuser means to define therebetween a diffuser gap, and said throttle valve element cooperates with said diffuser means to control flow of the mixture.

4. An apparatus as defined in claim 1 wherein said means for extracting comprises means defining an opening in said throttle valve element.

5. An apparatus for separating component species of a mixture at least one of which species is a fluid, the mixture including at least one or more species of specific weight different from that of the fluid, said apparatus comprising a feeding plate, a converging nozzle, a throat, a diverging diffuser, and a throttle valve;
   said feeding plate for feeding the mixture into said converging nozzle so as to establish flow of the mixture along a path within said converging nozzle to induce radial separation of the species;
   said throat communicating with the downstream end of said converging nozzle;
   said diverging diffuser communicating with the downstream end of said throat;
   said throttle valve for controlling flow of the mixture within said apparatus, including a throttle valve element which is disposed at least partially within said diverging diffuser and which cooperates with said diverging diffuser to control flow of the mixture, and for providig an annular outlet of variable cross-sectional area; and at least one other outlet.

6. An apparatus as defined in claim 5 comprising means defining an opening in said throttle valve element for extracting at least one species therethrough.

7. An apparatus as defined in claim 6 comprising means for moving said throttle valve element axially relative to said diverging diffuser.

8. An apparatus for separating component species of a mixture at least one of which species is a fluid, the mixture including at least one or more species of specific weight different from that of the fluid, said apparatus comprising:
   a converging nozzle;
   a feeding plate for feeding the mixture into said converging nozzle to establish flow of the mixture along a path within said converging nozzle to induce radial separation of the species;
   a diverging diffuser communicating with the downstream end of said converging nozzle;
   means for controlling flow of the mixture within said apparatus, including a throttle valve element which is disposed at least partially within said diverging diffuser, and for providing and annular outlet of variable cross-sectional area; and at least one other outlet.

9. An apparatus as defined in claim 8 wherein said throttle valve element is disposed coaxially with said diverging diffuser to define therebetween a diffuser gap, and said throttle valve element cooperates with said diverging diffuser to control flow of the mixture.

10. An apparatus as defined in claim 9 comprising means for moving said throttle valve element axially relative to said diverging diffuser.

11. An apparatus as defined in claim 10 including means defining an opening in said throttle valve element for extracting at least one species therethrough.

12. An apparatus as defined in claim 9 comprising means defining an opening in said throttle valve element for extracting at least one species therethrough.

13. An apparatus as defined in claim 12 wherein said means defining the opening comprises means defining a plurality of openings in said throttle valve element for simultaneously extracting a plurality of different species.

14. An apparatus as defined in claim 12 wherein the opening in said throttle valve element is axially disposed.

15. An apparatus as defined in claim 14 comprising means for moving said throttle valve element axially relative to said diverging diffuser.

16. An apparatus as defined in claim 15 comprising a throat disposed intermediate said converging nozzle and said diverging diffuser.

17. An apparatus as defined in claim 16, said throat comprising a constant diameter section disposed between said converging nozzle and said diverging diffuser and including means defining an opening in said throat for extracting at least one species.

18. An apparatus as defined in claim 16, said throat comprising a converging section disposed between said converging nozzle and said diverging diffuser and including means defining an opening in said throat for extracting at least one species.

19. An apparatus as defined in claim 16 further comprising additional feeding means for feeding at least one additional mixture into said converging nozzle through the center of said feeding plate.

20. An apparatus as defined in claim 16 further comprising additional feeding means for feeding at least one additional mixture into said converging nozzle through a wall of said converging nozzle to an axially disposed location downstream of said feeding plate.

21. An apparatus as defined in claim 16 further comprising additional feeding means for feeding at least one additional mixture into said converging nozzle through a non-centrally located opening in said feeding plate.

22. An apparatus as defined in claim 16 wherein said converging nozzle has a baseline up to about 15 degrees.

23. An apparatus as defined in claim 22 wherein said converging nozzle has a baseline angle of about 3 degrees to about 6 degrees.

24. An apparatus as defined in claim 8 further comprising additional feeding means for feeding at least one additional mixture into said converging nozzle through the center of said feeding plate.

25. An apparatus as defined in claim 8 further comprising additional feeding means for feeding at least one additional mixture into said converging nozzle through a wall of said converging nozzle to an axially disposed location downstream of said feeding plate.

26. An apparatus as defined in claim 8 further comprising additional feeding means for feeding at least one additional mixture into said converging nozzle through a non-centrally located opening in said feeding plate.

27. An apparatus as defined in claim 8 comprising means for moving said throttle valve element axially relative to said diverging diffuser.

28. An apparatus as defined in claim 27 including means defining an opening in said throttle valve element for extracting at least one species therethrough.

29. An apparatus as defined in claim 8 wherein said converging nozzle has a baseline angle of up to about 15 degrees.

30. An apparatus as defined in claim 29 wherein said converging nozzle has a baseline angle of about 3 degrees to about 6 degrees.

31. A method of separating component species of a mixture at least one of which species is a fluid, the mixture including at least one or more species of specific weight different from that of the fluid, said method comprising the steps of:
feeding the mixture into a converging nozzle;
establishing flow of the mixture along a path within said converging nozzle to induce radial separation of the species within said converging nozzle;
providing a first annular outlet of variable cross-sectional area for controlling flow of the mixture with a throttle valve downstream of the converging nozzle, the throttle valve including a throttle valve element disposed at least partially within a diverging diffuser and cooperating with the diverging diffuser to control flow of the mixture; and
extracting at least one of the species through a second outlet in the throttle valve element.

32. A method as defined in claim 31 further comprising the step of passing the mixture through a throat intermediate said converging nozzle and said throttle valve.

33. A method of separating component species of a mixture at least one of which species is a fluid, the mixture including one or more first species comprising solid particles of a relatively smaller size and a relatively higher specific weight and one or more second species comprising solid particles of a relatively larger size and a relatively lower specific weight, said method comprising the steps of:
feeding the mixture into a converging nozzle;
establishing axial flow of the mixture along a path within said converging nozzle to induce radial separation of the species within said converging nozzle;
controlling flow of the mixture with a throttle valve downstream of the converging nozzle, the throttle valve including a throttle valve element which is disposed at least partially within a diverging diffuser to define therebetween an annular diffuser gap of variable cross-sectional area and which cooperates with the diverging diffuser to control flow of the mixture;
extracting one or more of the second species through the diffuser gap; and
extracting one or more of the first species through an opening in the throttle valve element.

* * * * *